United States Patent
Hockaday et al.

(10) Patent No.: US 6,645,651 B2
(45) Date of Patent: Nov. 11, 2003

(54) FUEL GENERATOR WITH DIFFUSION AMPOULES FOR FUEL CELLS

(76) Inventors: Robert G. Hockaday, 127 Eastgate Industrial Park, Los Alamos, NM (US) 87544; Patrick S. Turner, 127 Eastgate Industrial Park, Los Alamos, NM (US) 87544; Zachary R. Bradford, 127 Eastgate Industrial Park, Los Alamos, NM (US) 87544; Marc D. DeJohn, 127 Eastgate Industrial Park, Los Alamos, NM (US) 87544; Carlos J. Navas, 127 Eastgate Industrial Park, Los Alamos, NM (US) 87544; F. Wade Uhrich, 127 Eastgate Industrial Park, Los Alamos, NM (US) 87544; Heathcliff L. Vaz, 127 Eastgate Industrial Park, Los Alamos, NM (US) 87544; L. Luke Vazul, 127 Eastgate Industrial Park, Los Alamos, NM (US) 87544

(*) Notice: Subject to any disclaimer, the term of this patent is extended or adjusted under 35 U.S.C. 154(b) by 179 days.

(21) Appl. No.: 09/870,506

(22) Filed: Jun. 1, 2001

(65) Prior Publication Data

US 2002/0182459 A1 Dec. 5, 2002

(51) Int. Cl.[7] ............................................. H01M 08/06
(52) U.S. Cl. ........................... 429/19; 429/17; 422/236; 48/61; 48/198.2; 48/DIG. 5
(58) Field of Search ............................. 429/19, 34, 17, 429/39; 422/236, 239; 48/198.2, DIG. 5, 61

(56) References Cited

U.S. PATENT DOCUMENTS

| 4,713,234 A | * | 12/1987 | Weirich et al. | .......... 422/198 X |
| 5,958,091 A | * | 9/1999 | Sakai et al. | .................... 48/61 |
| 2001/0045364 A1 | * | 11/2001 | Hockaday et al. | ........ 429/33 X |
| 2002/0088178 A1 | * | 7/2002 | Davis | ............................ 48/61 |

* cited by examiner

Primary Examiner—John S. Maples
(74) Attorney, Agent, or Firm—James Creighton Wray; Meera P. Narasimhan

(57) ABSTRACT

A system of two fuel ampoules that can deliver a reactant by diffusion through one of the ampoule walls to the other, such that when said reactant enters the second ampoule, it reacts with another reactant in said second ampoule, making hydrogen gas as a product. Both ampoules are stored in a fuel impermeable container. These ampoules used with small low power fuel cells which need a steady controlled uniform delivery of vaporous fuel such hydrogen and alcohols. This fueling system provides a simple safe fuel interactive system for small hydrogen fuel cells that prevents inadvertent hydrogen production by any single ampoule being exposed to water or typical consumer environments.

43 Claims, 7 Drawing Sheets

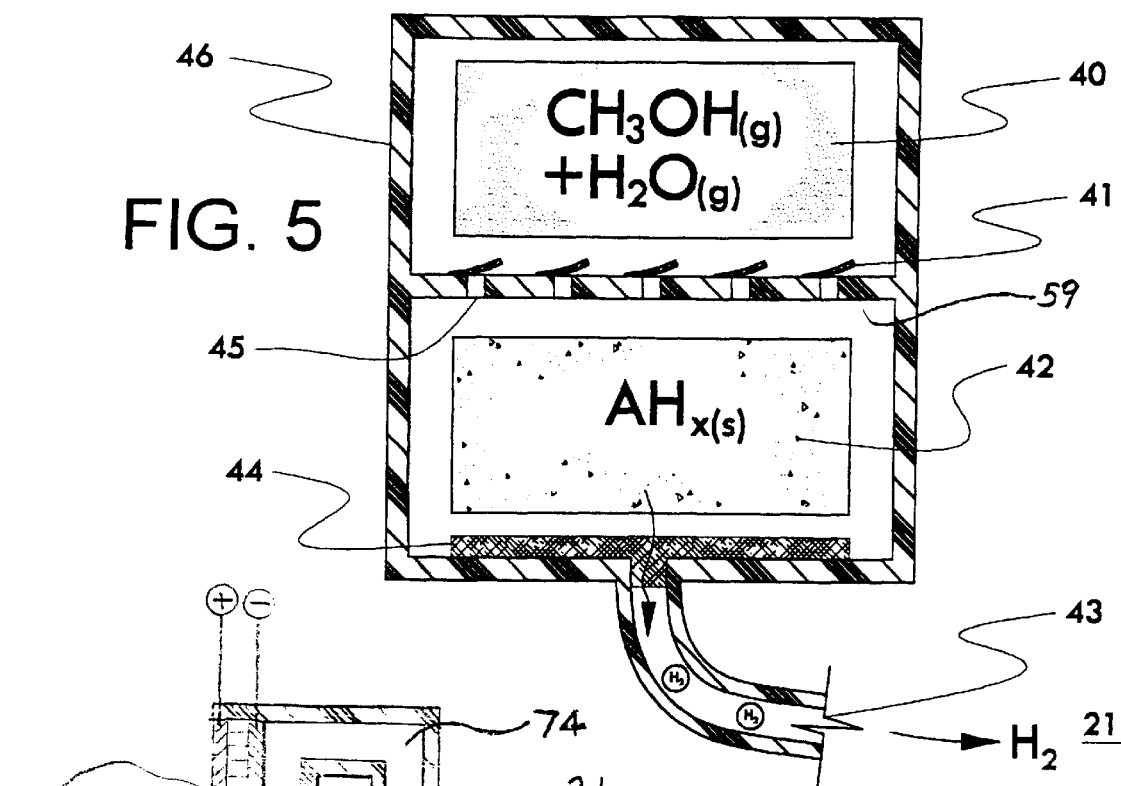
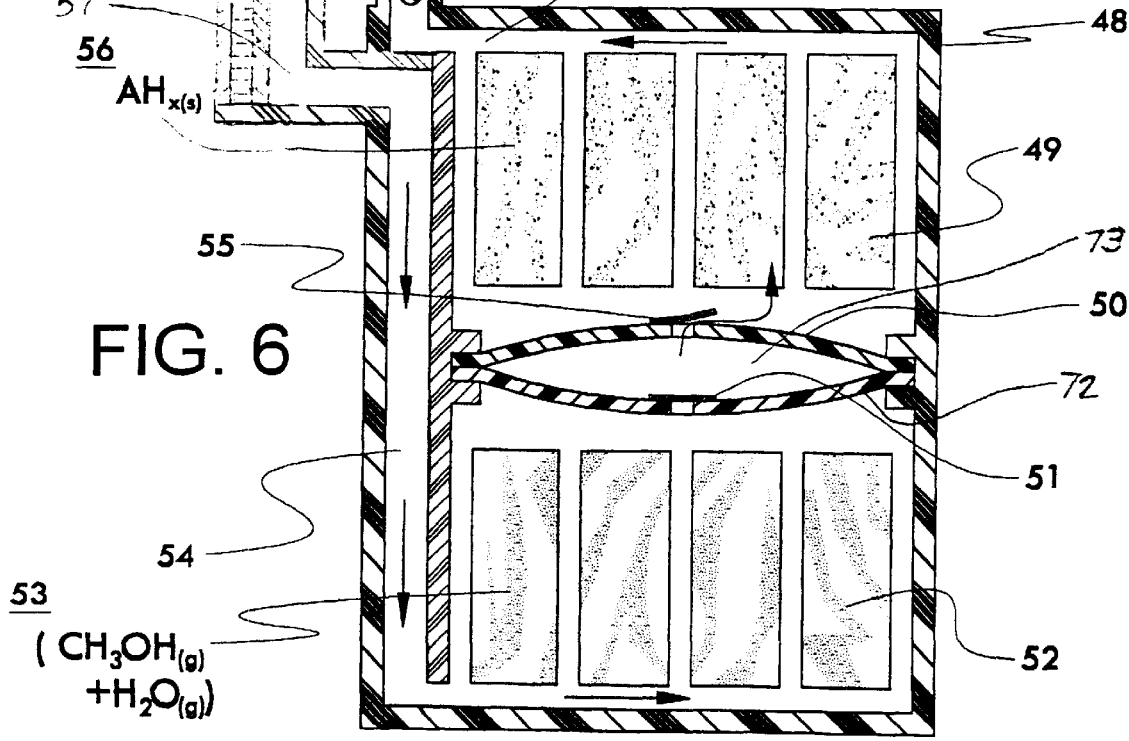

FUEL GENERATOR WITH DIFFUSION AMPOULES FOR FUEL CELLS

BACKGROUND OF THE INVENTION

Fuel cells directly transform chemical energy to electrical energy by reacting electrochemically gas or liquids in the presence of an electrolyte, electrodes and a catalyst. Our previous U.S. Pat. No. 4,673,624 "Fuel Cell", U.S. Pat. No. 5,631,099 "Surface Replica Fuel Cell, and U.S. Pat. No. 5,759,712 "Surface Replica Fuel Cell for Micro Fuel Cell Electrical Power Pack" described a method of forming a fuel cell that efficiently utilizes expensive catalysts, is easily mass produced, and can be packaged for portable electronics.

A variety of methods for production and/or delivery of hydrogen gas into fuel cells are known. Some of them include pressurized hydrogen storage in cylinders and storage into metal hydride alloys, such as those used in Ni—MH rechargeable batteries.

Needs exist to provide safe and convenient sources of hydrogen fuel for fuel cells at a low cost, especially in portable power applications.

A different way of creating and delivering this hydrogen is to use chemical hydride compounds that absorb water or other liquids or gases which react with the chemical hydride to form hydrogen. The hydrogen then diffuses out and is delivered to the fuel cell or hydrogen consuming device.

There are a variety of chemical hydrides which release hydrogen when combined with water. Their reaction with water can be described by the following general equation:

$$MH_x + xH_2O \rightarrow M(OH)_x + xH_2$$

where M is a metal of valence x. Examples of these chemical hydrides include LiH, LiAlH$_4$, LiBH$_4$, NaH, NaAlH$_4$, NaBH$_4$, MgH$_2$, Mg(BH$_4$)$_2$, KH, KBH$_4$, CaH$_2$ and Ca(BH$_4$)$_2$ (Kong et. al). Kong et al. showed that LiH, LiAlH$_4$, LiBH$_4$, NaH, NaBH$_4$ and CaH$_2$ all deliver a large fraction of their hydrogen capacity upon reaction with water vapor. Conversely, LiBH$_4$ and NaBH$_4$ were observed not to react with water vapor and there was no reaction with water until the powders were effectively dissolved. The U.S. Army Mobility Equipment Research and Development Command developed a system in which liquid water flows from a reservoir into a chamber where it contacts a porous hydrophobic membrane. In this system, water vapor diffuses through the membrane and spontaneously reacts with the hydride to release hydrogen, which then flows out of the reaction chamber to the anode of the fuel cell. Hydrogen production is controlled by virtue of water being forced back into the water reservoir during periods of no load, when the hydrogen is not being consumed.

As another example, Millennium Cell has developed a chemical hydrogen generator based on basic solutions of sodium borohydride (Amendola et al.). The generation of hydrogen is based on the reaction:

$$NaBH_4 + 2H_2O \rightarrow NaBO_2 + 4H_2 \tag{1}$$

Basic solutions of sodium borohydride were shown to be stable. A catalyst (Ru) releases hydrogen when in contact with the solution and therefore requires mechanical means to bring the solution into contact with the catalyst. This adds complexity to the system.

This last case is a particular example of the more general case where NaBH$_4$ and water are chosen from a larger class of compounds A and B, respectively.

This new invention addresses the pre-existing problems.

SUMMARY OF THE INVENTION

A subject of this invention is to advance fueling systems such as described in our U.S. Pat. No. 5,759,712 that has the fuel ampoules sealed in gas tight packages. An advance is to arrange a system of two ampoules or components (A and B) such that when placed together produce hydrogen and when separated do not. Diffusion regulation mechanisms are used to regulate the production rates, as well as the choice of both A and B components. An objective is to make hydrogen fueling system safer for hydrogen consuming systems such as fuel cells. In products, an A ampoule and a B ampoule are placed in a cavity and sealed together. Reactants diffuse through the walls of one of the ampoules into the other ampoule through the walls of the second ampoule. The reaction then produces hydrogen gas which diffuses out of the second ampoule.

Obvious applications of a small fuel cell are in those that are currently powered by batteries, especially rechargeable batteries. By safely encapsulating intrinsically energetic fuels with an interactive hydrogen release reaction, the fuel cells can have higher energy per unit mass, higher energy per unit volume, and be more convenient for the energy user.

Our invention provides a safe, convenient, inexpensive and portable hydrogen generator which can be used to fuel a PEM fuel cell. Component A is chosen from chemical hydrides such as LiH, NaH, NaBH$_4$ CaH$_2$ and LiAlH$_4$, among others. Component B may include, but is not limited to, substances such as water, alcohols, organic and inorganic acids (e.g. acetic acid, sulfuric acid), aldehydes, ketones, esters, nitrites and superacids (e.g. polyoxotungstates), and combinations thereof. Depending on the choice of component B, an appropriate selectively permeable membrane should be selected (e.g. silicone rubber for methanol).

Our recently issued patent U.S. Pat. No. 6,194,095 describes how the non-bipolar fuel cells can be packaged to form larger power supplies. Our pending patent no. U.S. Ser. No. 09/821,053 describes an ampoule of fuel that can be delivered at a controlled and constant rate by using the selective permeability of the fuel tank. In some fuel cells a controlled release of hydrogen or other gas is also needed.

This patent describes a recipe where the choice of A and B influences the rate of hydrogen gas generation. More importantly, this patent discloses a method for combining both chemicals without the aid of any mechanical means, thus resulting in a chemical hydrogen generator which is safe, portable and inexpensive.

In our patent application No. U.S. Ser. No. 09/821,053, a liquid hydride solution is immobilized and its contact is controlled with capillary wicking material. It does not have the feature of two components in diffusion contact, instead describing physical contact of a single fuel with a catalyst. Capillary wicking can be used to immobilize any liquid reactants in a two component diffusion delivery system.

In our patent U.S. Pat. No. 5,759,712, a vapor phase transport to a hydrophilic outer surface of a gas manifold is described. Selectively permeable membranes in proximity to the fuel cell are described for delivering reactants and products. Fueling is done by breaching a fuel tank and wicking fuel, which is then transported to the fuel cells in the vapor phase. Breaching this fuel tank can lead to spilling of fuel while liquid contact needs to be maintained with the fuel in the fuel tank. Thus, as the fuel tank runs low on fuel some of the fuel may not be in liquid contact and will be unused. To achieve wicking fuel delivery, the fuel needs to be fluid and mobile thus increasing the possibilities of leakage from the fuel ampoule. Gravity can affect the delivery of a liquid fuel. Achieving a good liquid seal on methanol fuel can lead to complex and costly sealing mechanisms for the fueling system and the fuel cell system. Small leaks of liquid fuel compared to vapor loss through the same hole can have a far greater detrimental effect on the air electrode and total fuel loss.

In our U.S. Pat. No. 6,326,097 the fuel cell and fueling ampoules are shown being placed in proximity to each other with a diffusion mat. The fuel tanks are described as a liquid wick or fluid motion fueling. Fuel diffusion from the fuel tanks is not described. Plastic blister packaging of the fuel tanks does not indicate the sealing properties of the package, nor individual sealing. Porous fillers are described as being in the fuel tanks, but not as diffusion delivery means.

Hydrogen Gas Generation

Chemical hydrides are known to react with water and give off hydrogen gas as a product. Reaction (1) shown above serves as an example. In general, hydrogen generation occurs when the hydride ion reacts with a proton from another source. Water is the most common source of protons used, and hence its reactions with chemical hydrides have been extensively studied and are well documented. Additives which reduce the pH of the aqueous solution result in a higher rate of hydrogen generation. Conversely, raising the pH to an appropriate level can stabilize sodium borohydride solutions, effectively lowering the reaction rate to the point where almost no hydrogen evolves.

Other reactants may be used instead of water. For example:

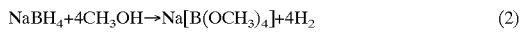

We have carried out this reaction in our laboratories and found that the rate of hydrogen generation in the methanolysis reaction is considerably higher than in the hydrolysis reaction. As an example, the powder form of $NaBH_4$ can be mixed as a slurry in a silicone rubber mix to be encapsulated. Water or methanol diffuse through the silicone rubber to the $NaBH_4$ and the generated hydrogen can diffuse out. An encapsulated cylinder with water or methanol and a separate encapsulated $NaBH_4$ cylinder could be placed together in the fuel manifold of a fuel cell to generate hydrogen. We have found this vapor delivery system at room temperature and conditions to be very slow and unsteady with water as the reactant. However with methanol vapor it is immediate and steady. We have tested the produced gas in a residual gas analyzer and confirmed that the product gas is hydrogen, as expected from reaction (2).

This reaction system allows us to package the reactants as an AB system of two ampoules which separately do not make hydrogen at a significant rate. We have also found that ethanol and isopropanol do not significantly react with $NaBH_4$.

Our pending patent application U.S. Ser. No. 09/821,053, the disclosure of which is incorporated herein by reference, discloses a method of using a selectively permeable membrane to diffuse selected chemical species (e.g. methanol through silicone rubber) to provide fuel for a fuel cell. That invention is herein expanded by including a separate component, namely a chemical hydride contained in an ampoule, which reacts which said diffused species producing hydrogen gas which can then be used to fuel a PEM fuel cell.

Other reactions may be used to generate hydrogen. Alkaline, alkaline earth metals and metals from Groups IIIA and IVA may react with water, alcohol or dilute acids to liberate hydrogen. The metals may be encapsulated in a matrix and the reactant (water, methanol, dilute acid) allowed to diffuse in through a selectively permeable membrane.

The reaction of the hydrides with water produces basic solutions and compounds. When the product is a strong base this can be neutralized with carbon dioxide to form a carbonate and water. Other alternatives are the reactions with acids. This makes available more water for the reaction with the hydride and neutralizes the caustic base. The carbon dioxide could come from the direct methanol or hydrocarbon utilizing fuel cell. In some cases by making water available from the reaction this would be a net gain in the energy per unit mass for the system. An ideal combination might be a hydrocarbon which results in hydrogen gas and a carbonate product when combined with the chemical hydride. A fueling system is made up of two diffusion ampoules which slowly diffuse into the other to produce hydrogen gas and solid encapsulated carbonate products when placed within an enclosure. As an example, consider the reaction of water with lithium hydride:

A subsequent reaction takes place between LIOH and $CO_2$:

The water resulting from (4) can react with unreacted LiH as shown in reaction (3) to further produce hydrogen gas. At the same time, a more benign end product (lithium carbonate) is produced.

In our previous patents U.S. Pat. No. 5,631,099 and U.S. Pat. No. 5,759,712, the carbon dioxide exhaust can diffuse out through a selectively permeable membrane or the fuel tank itself. This feature can control reaction (4). We have found that a simple gaseous diffusion route such as a capillary tube can effectively exhaust product gases and maintain gas pressure equilibrium across the fuel cells. The capillary tube can also function as a controlled leak for the beneficial in-leakage of oxygen to the fuel electrode.

The production of fuel such as hydrogen from a chemical hydride can be regulated by delivery of moisture or acid. A valve or pump can used to regulate moisture from a tank containing the moisture to the second tank containing the hydride. This is an AB system where the two tanks work together. The moisture can be also very useful to maintain the humidity for the fuel cells. Thus all the separate parts can form an interacting system. The moisture valve can be a membrane with small controllable apertures, or a gap between the tanks that is increased to decrease the delivery of reactants and is decreased to increase the delivery of reactants.

Hydrogen ion-drag pumping through a membrane can be used to drag water and solvents from one ampoule to the other. This can act as a solid state pumping system to move reactants. The amount of reactant moved across the membrane is proportional to the electrical current going through the membrane. Thus, the production of hydrogen can be controlled through the electrical current through the separating membrane. Examples of a suitable membrane are Nafion with platinum-catalyzed electrode on either side.

Another feature is to add a separate catalyst mixed with the hydride to increase the hydrogen production rate. Noble metal catalysts (e.g. Pt, Ru) and transition metals in general are particularly suitable to perform this function. Other suitable catalysts are substances such as $Co_2B$, $CoCl_2$, $CuCl_2$, $NiCl_2$, $Fe_2$ when mixed with $NaBH_4$ powder.

Selectively Permeable Membranes

By having a selectively permeable fuel tank wall, the fuel delivery can have the advantageous effect of delivering fuel at a constant rate throughout its life cycle. Component B may be made up of two or more chemicals, one or more of which may react with the chemical hydride. If the membrane had similar permeability to the main chemical in component B (i.e. the fuel) compared to a minority chemical in component B, the latter would diffuse in while the former diffused out. The presence of this minor chemical would drop the fuel vapor pressure and reduce the rate at which fuel can diffuse out. Thus, the rate of fuel delivery would gradually drop. As an example, our measurements on silicone rubber membranes show a molecular diffusion rate difference for methanol over water of 20 to 36 times. In performance tests with a small ampoule containing 95% methanol and 5% water with a silicone rubber membrane, the fuel delivery system is effective in delivering fuel with only a small fraction of the original fuel volume left as water in the fuel container.

Mixed fuels in component B made up of chemicals such as methanol, formaldehyde, formic acid and water could be used in the fuel ampoule. If these additives are permeable through the fuel ampoule they will also be delivered according to their respective rates and concentration gradients. The fuel ampoule material could also be chosen or designed by a mixture of materials to have a permeability that allows the fuel to be delivered at the rate ratio matching that of the fuel. An example is an ampoule wall material that has a 1:1 diffusion rate for methanol over water. Thus, if fueled by a 1:1 fuel mixture and assuming a low exterior concentration of both, the diffusion delivery system would deliver fuel at a 1:1 concentration.

The process of enhancing the selective vaporization of fuel from a membrane is called per-evaporation. It essentially increases the evaporation of that fuel. The ampoule membrane may use this effect when the fuel concentration is low. It can keep the fuel concentration higher at the fuel cell than it would be without the fuel ampoule selectively permeable membrane.

The tank walls can be made of composite materials. Examples are fiberglass cloth and silicone rubber, where the fiberglass cloth gives mechanical strength and the silicone rubber has high diffusion rate properties. The mechanical and diffusion properties of the fuel tanks can be adjusted to reflect the blend of materials and components making up the fuel system. The tanks may also be made in layers. One option is to make the outer layer have the highest diffusion resistance and have a single fuel such as methanol, with the interior having rapid diffusion. This would give the fuel delivery a flat output with time, matching the vapor pressure of the fuel liquid, and then a steep decline as the remaining vapor diffuses out of the interior materials and voids.

Incorporating electrical and mechanical diffusion control into the fuel ampoule or between the fuel ampoule and the fuel cell allows the membrane diffusion to have a feedback mechanism to adjust to consumption demands by the fuel cell, or to different environmental conditions around the system. Possible mechanisms are drawing fuel using ionic drag through a membrane, piezoelectric operating of micro apertures in the membrane, or impermeable membranes that act as apertures which can be adjusted to a specific opening path between the fuel ampoule and the fuel cell, or alternatively a fan.

The permeability of the fuel ampoule can vary with temperature. This property can be used to match the fuel cell consumption rate as the temperature increases. The permeability rate can also be chosen to not rise as much as the fuel cell consumption rate to keep the fuel cell at higher temperatures using more fuel than necessary. This could be the case in power applications where the power delivery is constant regardless of the temperature environment.

Molecular filtration can be used to keep impurities that can be dissolved in the fuel or come with the fuel to be left in the fuel ampoule. This feature can be used to allow a fuel of low purity. The fuel cell may also be protected by using the same principle. The hydrogen gas generated inside the ampoule with the chemical hydride may be filtered using a selectively permeable membrane made of palladium or an alloy thereof before the hydrogen fed to the PEM fuel cell. This keeps impurities from affecting fuel cell performance.

The vapor fuel delivery and selective permeability of the ampoule also have the effect of filtering the fuel. Additives such as dyes, flame colorizers and bitterants can be added to the fuel to make the fuel safer and possibly aesthetically pleasing to consumers. Adding water absorbing chemicals can be added to the fuel to maintain the vapor pressure of the fuel. The interior of the tank could have a filler, such as cellulose sponge, that has a higher diffusion rate to fuel than the walls but would keep liquid fuel from being accessible even if the fuel tank is ruptured or crushed.

By simply being able to remove the fuel tank from a sealed container and sliding it into a chamber without alignment necessities, a system with large dimensional tolerances where the user can close the cover is very simple and makes it convenient and low error prone.

The fuel tank as it uses fuel, if it has selective fuel delivery, will mechanically collapse. This fuel tank collapse can be used to form a mechanical fuel status indicator. A color stripe could be used that moves by a viewing window the fuel ampoule could be used. The fuel tank itself can be tinted to give a visual indication of fuel level. The fuel can have colored dyes so that as the fuel is used it will give a color change indication of fuel status since the remaining fuel will be darker. The fuel ampoule can also have materials, such as salts, that produce an opaque interior or color change in the fuel ampoule as the fuel is used.

Safety

An important feature of our invention is that the chemical hydrides, traditionally thought of as dangerous can be safely immobilized in a number of ways.

The first is to contain the reactants inside a porous bag or material. The powdered hydrides are contained within a hydrophobic porous plastic such as microporous polypropylene. In the event that the bag is dropped in water, only vapor contact with the hydride is made. The liquid fuel can be held in a container that has porous walls that will gradually wick the fuel to the surface of the container.

The second is to employ a container which can be a wicking sponge material such that the chemical hydride or fuel are distributed through it.

Another way is to employ a container which can have a pore free material that surrounds the liquid or solid fuel. Delivery of reactants would be by diffusion through this material and may be selective, e.g. such as the preferential permeability of silicone rubber to methanol over water.

Yet another method employs an ion-exchange membrane. The fuels could be reacted with an ion exchange material making them chemically attached to a surface or polymer. Both A and B fuels could be held by the ion exchange materials.

Packaging

The next challenge is to package the diffusion system to work with fuel cells or other devices and maintain the desired flow rate. A potential problem is that the delivery rate of component B to the ampoule which contains component A will be uneven depending on where the individual particles of the latter are within their ampoule. Molecules of component B will react first with those particles in the adjacent ampoule closest to the selective membrane. This may have the effect that the rate of hydrogen production decrease with time. To compensate for this, the diffusion wall encapsulated materials or homogenous material composites can be perforated with small channels. The diffusion walls can also have their highest resistance concentrated at the surface. We have found in experiments that the encapsulation can gradually break apart as the reaction proceeds opening up further in diffusion routes. A fan or pump system that forces moist gas or fluid through the material can be used to increase the interaction of the water and the hydrides. With a feedback loop to this fan the output of the generator can adjust the production rate to match the consumption rate. The small perforation hydrophobic pores in silicone rubber keep liquid water from being able to penetrate and increase the production rate. The encapsulation can also be designed to have an outer skin that is the predominant rate limiting diffusion barrier and where the interior of the encapsulation has a relatively high diffusion rate.

An unusual design of a reactor that mixes various features of the above description and our previous patent No. U.S. Ser. No. 09/821,053 is to encapsulate the dry reactant in the form of a long capillary tube or tube bundle and a liquid filled capillary tube or tube bundle. Each of these capillary tubes can form a separate ampoule. When the two ampoules are pressed together contact is made with a liquid filled capillary tube and the dry reactant ampoule. Diffusion of liquid and direct liquid contact is forced into the dry hydrophobic reactant tubes by static pressure on the back of the liquid reactant tubes. The liquid reactant will diffuse into the walls of the tube and produce hydrogen which can diffuse back out through the walls of the tube. Bubbles will form and grow in the liquid and reactants and drive a water droplet through the long capillary tube until the droplet is broken. The flow of produced hydrogen will continue to push forward the liquid reactant vapor. A small pump or static pressure against the gas pressure in the back of the liquid capillary tube can control the reactant delivery. When the evolved gas pressure is high, it will force the liquid back out of the dry reactant capillary tubes to the source tube. This design does not have the capability to fully shut off the reaction due to the diffusion though the capillary tubes, but if either reactor has a long diffusion length of non reactant between each other this can be effective in reducing the reaction to a low rate.

The storage container of the permeable fuel container needs to be impermeable to the fuel. This container could be a disposable bag with metal coatings or coatings such as Aclar® (Honeywell Specialty Films, PO Box 1039, 101 Columbia Road, Morristown, N.J. 07962) PVDF polyvinylidene fluoride plastic. This tank could also be made of composite materials, such as PET plastic polyethylene terephthalate with an Aclar coating. The storage container could be a heat sealed bag with a tear point to allow the consumer to easily open. The essential parallel is that of packages for foods and ink jet cartridges.

These and further and other objects and features of the invention are apparent in the disclosure, which includes the above and ongoing written specification, with the claims and the drawings.

BRIEF DESCRIPTION OF THE DRAWINGS

FIG. 5 schematically shows a micro-valve regulated diffusion system.

FIG. 6 schematically shows a diaphragm pumped system.

DETAILED DESCRIPTION OF THE PREFERRED EMBODIMENTS

Figure 1:
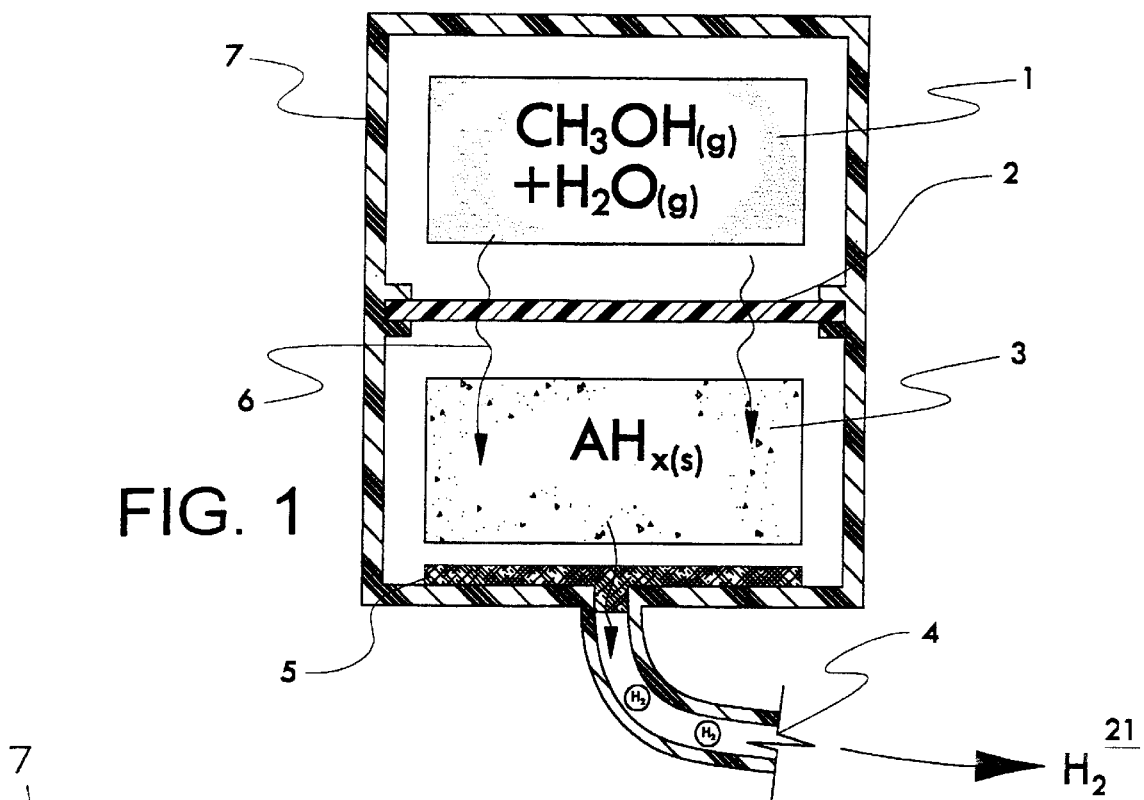
FIG. 1 schematically shows the basic diffusion reaction system.

The construction of a two ampoule fueling system is shown in FIG. 1. The volatile reactant ampoule 1 can be made of a polyvinyl alcohol sponge (PVA Sponge; Shima American Corporation, 171 Internationale Blvd., Glendale Heights, Ill. 60139) or cellulose sponge, soaked with methanol and water. Within the ampoule container 7 a solid reactant such as sodium borohydride is mixed within a material that is highly permeable to methanol such as a silicone rubber compound (AB mix GE silicones: RTV6166A silicone polymer and 6166B curing agent GE Silicones GE Company, Waterford, N.Y. 12188). This ampoule can be formed by mixing the sodium borohydride powder with this two component silicone and curing the mixture at 60° C. in an oven. The silicone rubber material AB mix GE silicones were chosen because they did not have water in the cure, and the silicone rubber is approximately 40 times more permeable to methanol compared to water. The hydrophobic nature of the silicone rubber also prevents liquid water from penetrating or wicking into the ampoule 3. Thus the embalmed sodium borohydride ampoule 3 has very low reactivity to liquid water if accidentally immersed in water. The two ampoules 1, 3 are separated by a selectively permeable membrane 2. This membrane 2 can be constructed of a fiberglass mat such as Freudenburg Eglass mat T-1785 (Freudenburg Non-Wovens Ltd., 221 Jackson St., Lowell, Mass. 01852) impregnated with silicone rubber adhesive (GE silicones RTV 118) and compressed between low density polyethylene sheets. This results in strong silicone rubber membranes that are 25 to 200 microns thick. The membrane is held in a gas tight frame of the container 7 separating the two reactant ampoules 1 and 3. At the gas exit of the container 7 a filter 5 covers the exit port 4 to filter the gas of particulate or unreacted materials. This filter 5 could be made of a porous polyethylene (0.03 micron pore; Mobil Chemical Company, Films Division, 729 Pittsford-Palmyra Rd., Macedon, N.Y. 14502) with sub micron pores. The filter 5 could also have selective permeability properties such as a thin palladium metal foil or a pore-free transition metal film supported on a substrate to filter the hydrogen 21 from the volatile reactants 6. In operation this system is expected to have container 7 open; then the two ampoules 1, 3 are inserted, and the container 7, is resealed. Methanol and water will diffuse from the volatile ampoule 1 through the separating membrane 2 and into the solid reactant ampoule 3. Hydrogen gas 21 is produced in the solid reactant ampoule 3 and it diffuses out of the ampoule, through the exit filter 5 and out the exit port 4.

Figure 2:
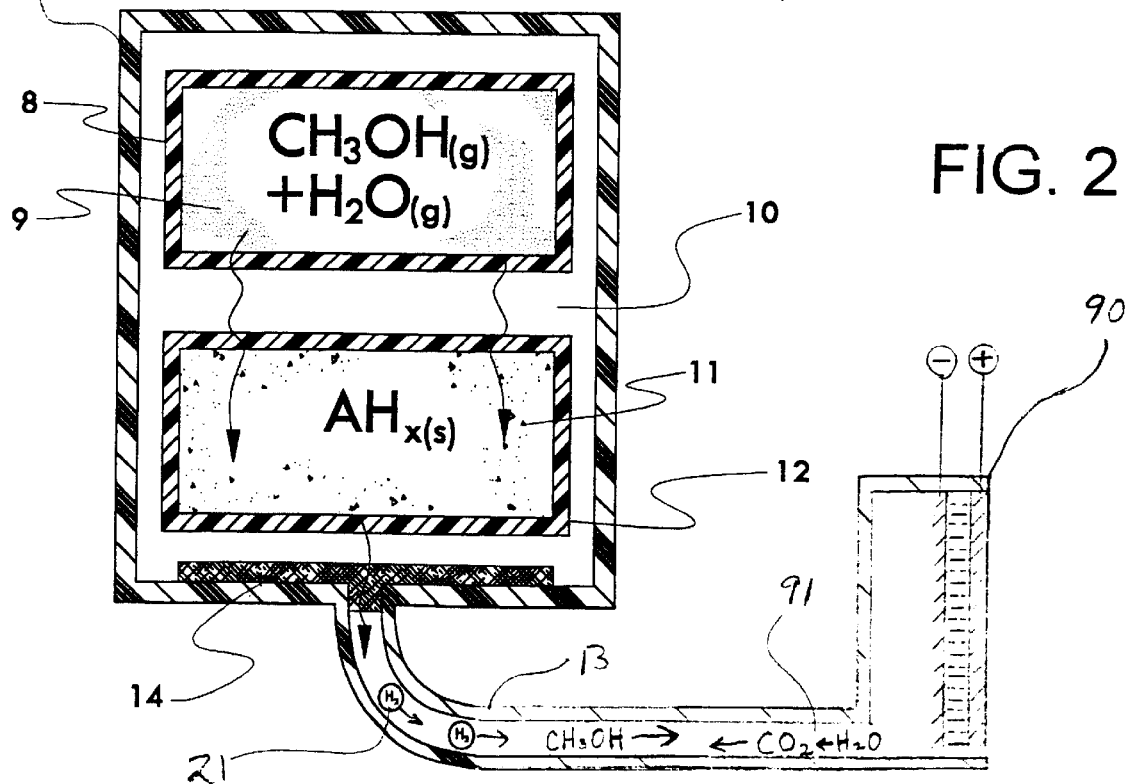
FIG. 2 schematically shows two encapsulated diffusion ampoule system.

In FIG. 2 a similar system as the membrane separated system is shown as in FIG. 1, except that there is no separating membrane 2. The two ampoule walls 8 and 12, are now the selective diffusion mechanism. The ampoules 8, 12 can be made out of silicone rubber enclosing a reactant filled sponge. In the volatile reactant ampoule 8 methanol fuel fills a sponge material such as PVA or cellulose. In the dry reactant ampoule 12 sodium borohydride powder 11 is packed into an open cell urethane foam or embalmed in silicone rubber. In operation the two ampoules 8, 12 are placed together inside the fuel container 7, and the container is sealed. The volatile reactant 8 diffuses into the powder ampoule 12. The volatile reactant reacts with the chemical hydride powder 11 in the powder ampoule 12, and hydrogen gas is produced. The hydrogen gas diffuses out of the powder ampoule 12 into the interior 10 of the container 7, and the hydrogen gas 21 goes through the exit filter 14 and out of an exit port 13. The exit filter can be a porous membrane such as porous polyethylene (Mobil Chemical Company, Films Division, 729 Pittsford-Palmyra Rd., Macedon, N.Y. 14502) or expanded PTFE (Corning Costar, One Alewife Center, Cambridge, Mass. 02140). Products of water vapor and carbon dioxide from the fuel cell or consuming device 90 diffuse back up the outlet tube 13 and through the exit filter 14. These products react with the chemical hydride in ampoule 11, 12 to produce more hydrogen. The hydrogen production of this device could be regulated through changing the gas separation gap 10 between the ampoules 8, 12, and the diffusion length through the exit filter 14 and exit tube 13 for the product 91 interactions with the fuel cell 90. The gas separation gap 10 is a diffusion limiting point in the system such that, if the container walls 7 are flexible and the ampoules 8, 12 are attached to the walls, the ampoules will move apart when the internal pressure increases, subsequently increasing the diffusion path 10 between the ampoules and reducing the hydrogen production rate.

Figure 3:
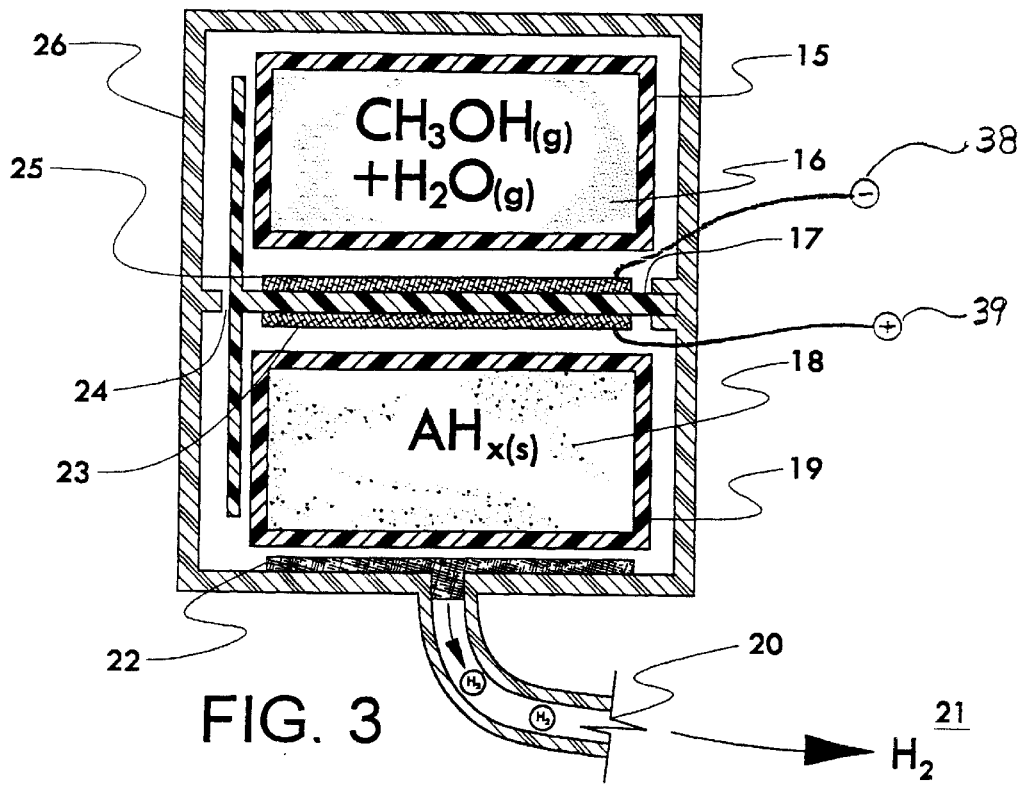
FIG. 3 schematically shows a water-ion drag for diffusion regulation.

In FIG. 3 a system that uses a ion-drag cell to move water and methanol from the volatile ampoule to the chemical hydride ampoule is shown. The volatile ampoule is constructed as a silicone rubber walled ampoule 15. It is filled with a sponge material such a PVA foam saturated with water and methanol 16. This ampoule is placed in the fuel system container 26. The second ampoule is a silicone rubber walled ampoule 19, filled with sodium borohydride powder and silicone rubber compound (AB mix GE silicones: RTV6166A silicone polymer and 6166B curing agent) 18. The membrane electrode assembly 23, 17, 25 separating the two ampoules 15, 19 is made up of a Nafion membrane 17 with sputter deposited electrodes 23 and 25 on either side of the membrane 17. The flow of hydrogen ions from the electrode 25 through the electrolyte 17 to 23 is regulated by the electrical current flow through the membrane 17. Hydrogen gas is converted to hydrogen ions on the catalytic electrode 17. These ions travel through the Nafion electrolyte 17 carrying with them 5 to 7 water or methanol molecules with each ion. When the hydrogen ions reach the other side of the membrane 17, two protons and two electrons make one hydrogen molecule on the catalytic electrode 23, and water and methanol evaporate from the electrode. The voltage and subsequent current on the electrodes 23, 25 comes from an external electrical feedback loop with the fuel cell or device that needs hydrogen on demand. Typically the current though the ion-drag cell would be proportional but smaller than the current output of the fuel cell. The wires 38 and 39 are attached to the catalytic electrodes 23, 25. Water, methanol and hydrogen from the surface of the cathode electrode 23 will diffuse through the ampoule wall 19 to the sodium borohydride powder a silicone rubber compound 18 in ampoule 19 and create hydrogen by hydrolysis. The hydrogen created then diffuses though the porous material and flows through the exit filter 22 or recycles through a long diffusion path 24. The recycled hydrogen will go through the ion-drag cell 23, 17, 25. The exit filter 22 can be formed out of porous membranes such as expanded PTFE (Filinert, Corning CoStar) or a selectively hydrogen permeable membrane formed by films of platinum on palladium silver alloy and platinum on a etched nuclear particle track membrane (Nuclepore, Corning Corstar). The membrane is embalmed in silicone rubber film and is sealed to the exit of the container 26. The filtered hydrogen 21 exits the container 26 through a vent hose 20 to a fuel cell or device needing hydrogen gas.

Figure 4:
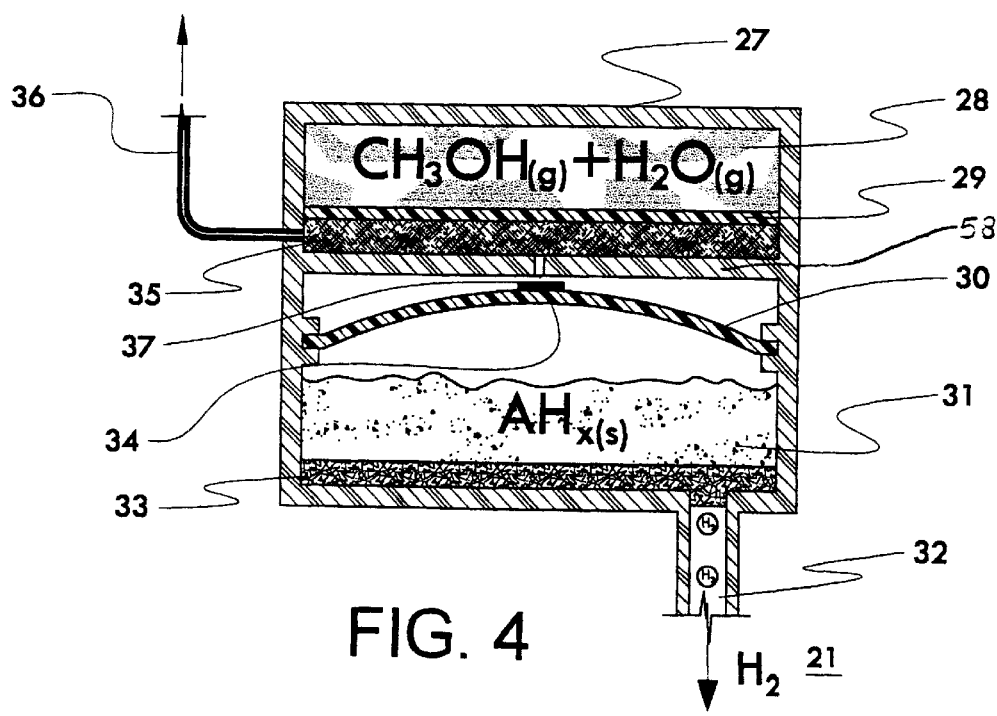
FIG. 4 schematically shows a diaphragm valve diffusion regulated system.

In FIG. 4 a binary chemical reaction system is shown with a diaphragm valve regulating the reaction diffusion between the two reactant ampoules. An ampoule of the volatile reactant 28 is placed in the container 27. This ampoule 28 is a PVA sponge saturated with methanol and water. A pore free diffusion membrane 29 and a porous membrane 35 are placed between the ampoule 28 and valve aperture 34. This drawing shows a single aperture 34 for simplicity in the drawings, but in actual devices an array of apertures spaced out over the separating wall 58 would be expected. On the other side of the separating wall 58 a selectively permeable membrane to methanol and water over hydrogen 30 is placed. This selectively permeable membrane 30 made of silicone rubber is 100 microns thick and is sealed to the container walls 27. The selectively permeable membrane 30 and has a small sealing disk 37 made with Viton rubber to seal with the valve aperture 34. The Viton rubber has low permeability to methanol and water. A second ampoule is formed by a mixture of sodium borohydride powder and silicone rubber compound 31 (AB mix GE silicones: RTV6166A silicone polymer and 6166B curing agent). A gas exit filter 33 can be formed out of porous membranes such as expanded PTFE (Filinert, Corning CoStar) or a selectively hydrogen permeable membrane formed by films of platinum on palladium silver alloy and platinum on a etched nuclear particle track membrane (Nuclepore, Corning Corstar). The membrane is embalmed in silicone rubber film and is sealed to the exit of the container 27. The filtered hydrogen 21 exits the container 27 through a vent hose 32 to a fuel cell or device needing hydrogen gas. A long diffusion vent gas line 36 is placed through the container wall 27, venting gas from the porous membrane 35. This vents to the atmosphere to let the selective permeable membrane 30 expand and contract with the pressure and gas generated by the sodium borohydride ampoule 31. When the hydrogen pressure from the sodium borohydride ampoule 31 is high the selective permeable membrane 30 will expand and press the sealing disk 37 against the sealing aperture 34. This will seal off the diffusion of methanol and water from the volatile source ampoule 28 to stop further reaction with sodium borohydride ampoule 31 and the production of hydrogen. When the hydrogen pressure drops the selective permeable membrane 30 will move away from the sealing aperture 34, and methanol and water can diffuse through the membrane and react with the sodium borohydride ampoule 31. This then leads to hydrogen production and the pressure rising. Thus a pressure regulated hydrogen production operates.

In FIG. 5 two reacting ampoules are separated by a microvalved separating wall. The volatile ampoule 40 is placed in the container 46. This ampoule is formed by enclosing a PVA sponge saturated with methanol and water with a silicone rubber container. An ampoule of sodium borohydride powder and silicone rubber compound 42 (AB mix GE silicones 42: RTV6166A silicone polymer and 6166B curing agent) is placed on the other side of the microvalved 41 separator wall 59. The micro valves 41 are placed over apertures 45 in the separator wall 59. The micro valves 41 are actuated by electrical or mechanical feedback system from the fuel cell or device. When the micro valves 41 are opened, the volatile reactants methanol and water diffuse to react with the sodium borohydride ampoule. When the micro valves are closed or partially closed, they stop or throttle down the diffusion of the volatile reactants and thus adjust the production of hydrogen. An exit filter 44 can be formed out of porous membranes such as expanded PTFE (Filinert, Corning CoStar) or a selectively hydrogen permeable membrane formed by films of platinum on palladium silver alloy and platinum on a etched nuclear particle track membrane (Nuclepore, Corning Costar). The membrane is embalmed in silicone rubber film and is sealed to the exit of the container 46. The filtered hydrogen 21 exits the container 46 through a vent hose 43 to a fuel cell or device needing hydrogen gas.

In FIG. 6 a system that uses a diaphragm pump to circulate hydrogen gas saturated with methanol and water vapor is shown. An ampoule 52 is made as a perforated PVA sponge saturated with methanol and water 53. The sponge 52 has gas channel perforations and is placed inside the container 48. The second ampoule 49 is formed as a molded ampoule, with gas channel perforations, by mixing sodium borohydride powder 56 and silicone rubber compound (AB mix GE silicones 42: RTV6166A silicone polymer and 6166B curing agent) and filling and separating from a mold. Between the two ampoules 52, 49 a diaphragm pump 50 is placed so that it is sealed against the container walls 48, forming a diffusion barrier when the pump is not running. The diaphragm pump is run by vibrating the diaphragm wall 50. When the diaphragm 50 moves away from the second diaphragm wall 72, hydrogen gas mixed with methanol and water is drawn into the cavity between the diaphragms 73 through the inlet valve 51. When the diaphragms 73 and 72 move toward each other, the gas flows out of the cavity between the diaphragms 73 and out through the exit valve 55. The methanol, water and hydrogen gas move through the chemical hydride ampoule 49. Hydrogen gas is produced, while the water and methanol are removed from the ampoule 49. The hydrogen gas stream 21 with some methanol vapor flows to the fuel cell 90 though exit tube 74. Unused hydrogen, carbon dioxide and water vapor from the fuel cell 90 flow through inlet tube 57 and through a long diffusion route 54. The moisture and carbon dioxide carried by the hydrogen flow 21 back to the ampoule 52, supplementing the volatile reactants from the volatile ampoule 52. The hydrogen gas stream then passes through the gas channels of the volatile ampoule 52, absorbing methanol and water and repeating the process. The diaphragm pump is controlled by a feedback loop to the fuel cell or hydrogen consuming device. The output of hydrogen is proportional to the flow rate of reactants through the pump. When the pump is not operated, methanol vapor diffuses back through the channel 54 to the fuel cell 90 and runs the fuel cell at a lower performance level than with hydrogen gas 21. Thus, the hydrogen generation can be used during needs of high power, and the low level loads can run on methanol vapor and a small amount of hydrogen produced by diffusion of methanol through the channels 54 and 74.

Figure 7:
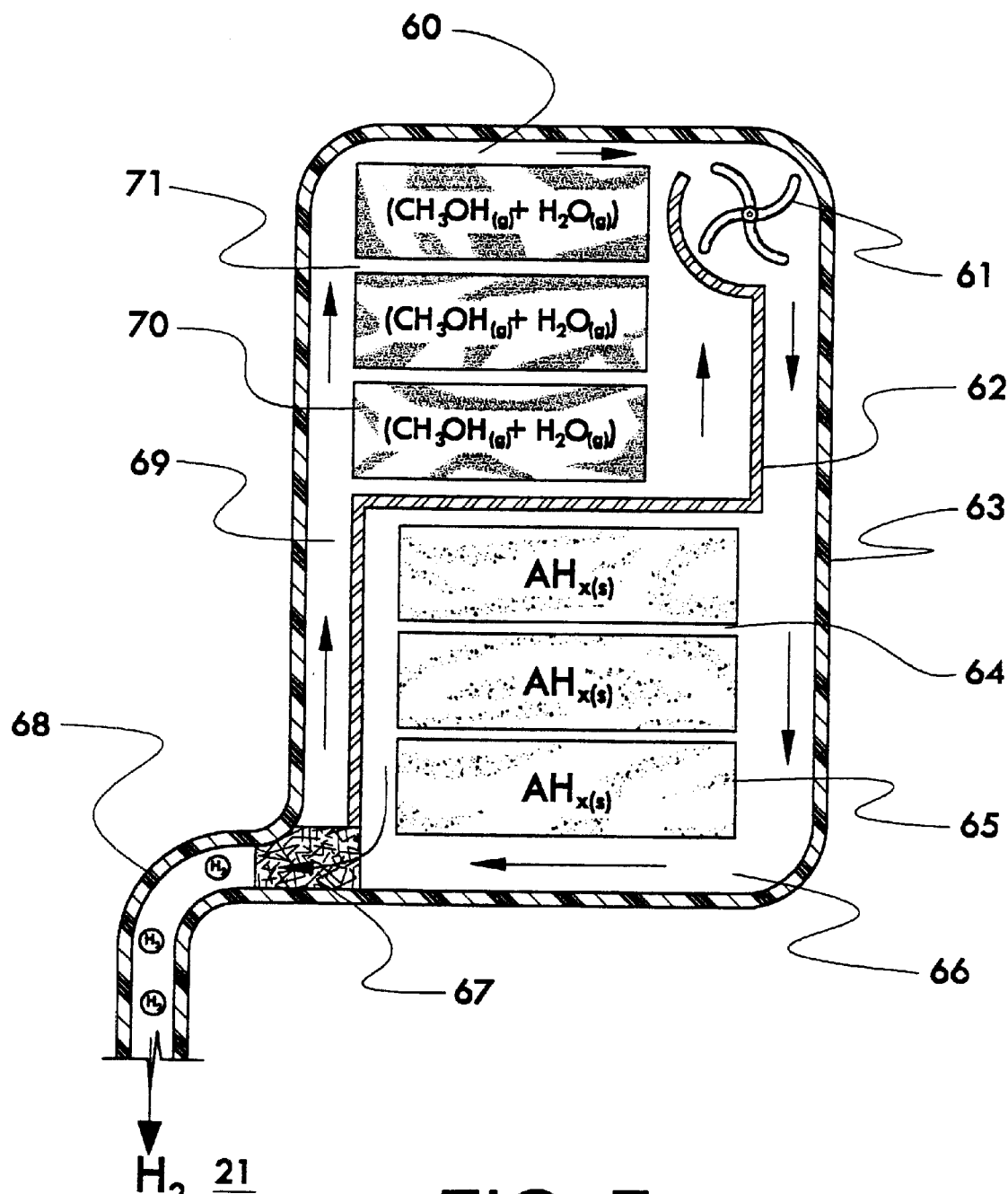
FIG. 7 schematically shows a gas pumped circulation system.

In FIG. 7 a system that uses a fan 61 to circulate hydrogen gas saturated with methanol and water vapor is shown. An ampoule 70 is formed as a perforated PVA sponge saturated with methanol and water. The sponge 70 has gas channel perforations 71 through the sponge. The sponge 70 is placed inside the container 68. The second ampoule 65 is formed as a molded ampoule, with gas channel perforations 64, by mixing sodium borohydride powder and silicone rubber compound (AB mix GE silicones 42: RTV6166A silicone polymer and 6166B curing agent) and filling and separating from a mold. Between the two ampoules 70, 65 a wall 62 and fan 61 are placed so that they are sealed against the container walls 68, forming a diffusion barrier when the pump is not running. When the fan 61 is run by electrical energy, hydrogen gas mixed with methanol and water is blown through the sodium borohydride ampoule 65 channels 64 and around 66. Sodium borohydride reacts with the methanol and water and produces hydrogen gas 21. The hydrogen gas flows though a filter of expanded PTFE 67. Part of the hydrogen gas 21 flow returns through a long diffusion route 69 to the volatile ampoule 70, and the rest exits through a tube 68 to the fuel cell or hydrogen consuming device. This system will produce hydrogen gas 21 proportional to the methanol and water flow rate through the fan 61. Thus, the controlling the fan 61 speed controls the hydrogen 21 production rate.

Figure 8:
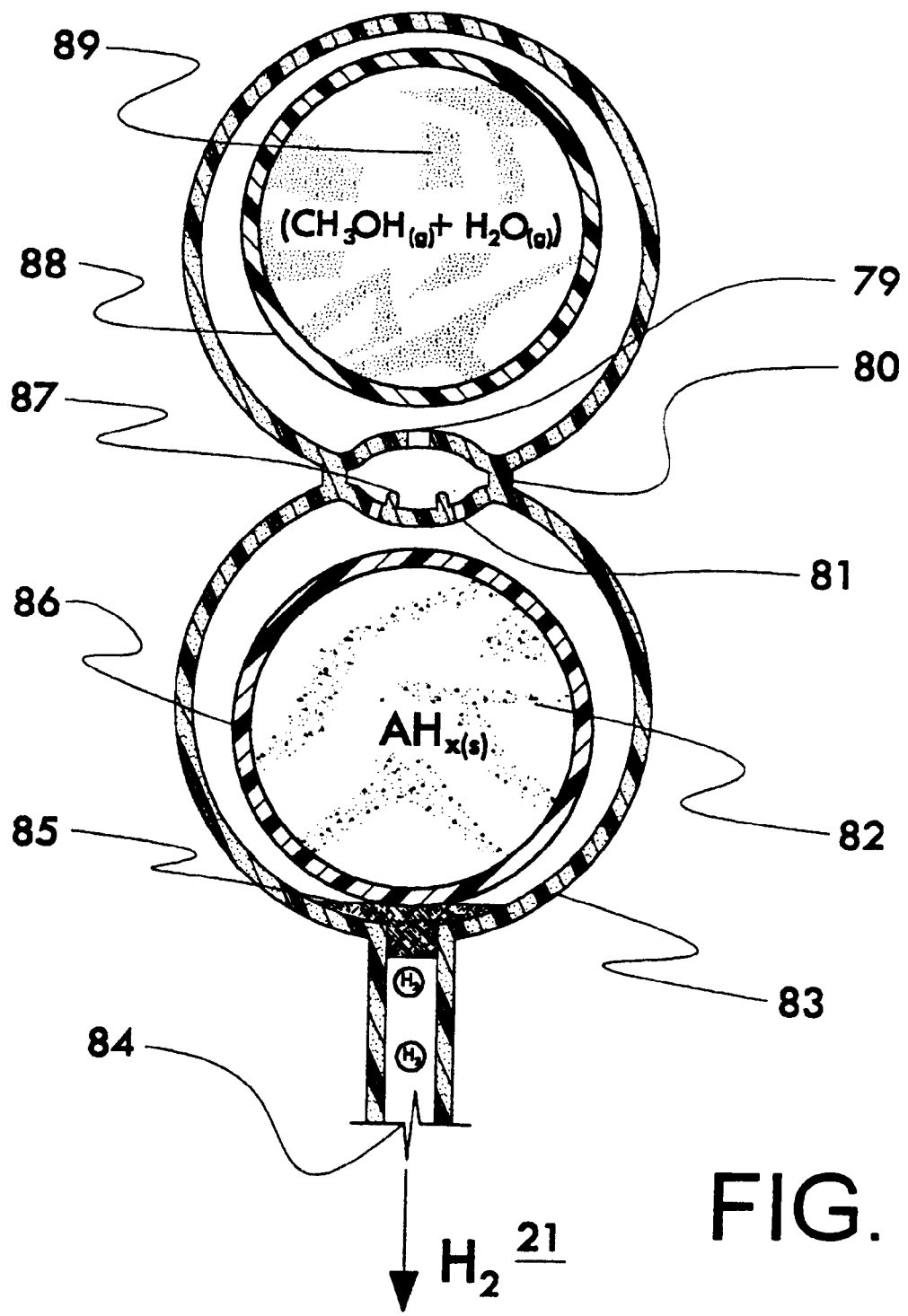
FIG. 8 schematically shows an elastic wall diffusion regulator.
Figure 10:
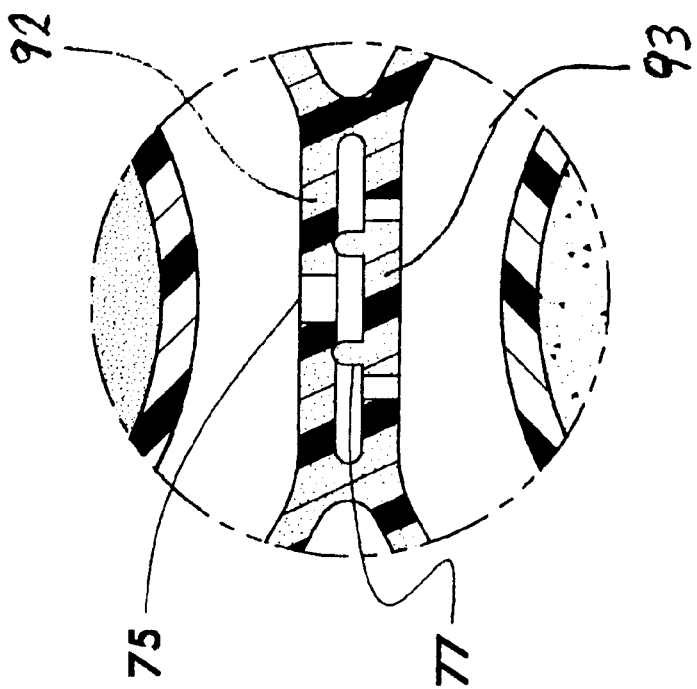
FIG. 10 schematically shows details of closed elastic valve.
Figure 9:
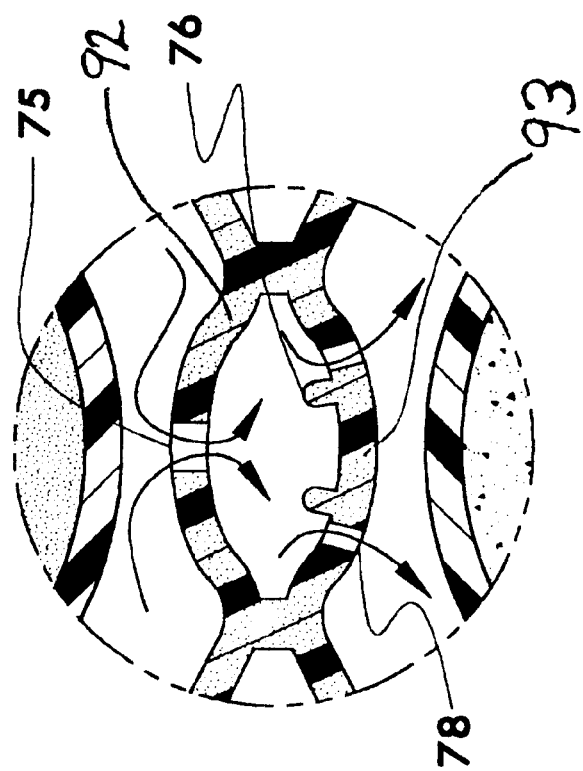
FIG. 9 schematically shows details of open elastic valve.

FIG. 8 shows a system that controls the production of hydrogen by controlling diffusion of reactants between ampoules with a valve that is closed by the wall tension in the container. The volatile reactant ampoule is formed by enclosing a methanol and water saturated PVA sponge 89 with silicone rubber membrane 88, 10 to 200 microns thick. The volatile reactant ampoule 88, 89 is placed inside the Viton™ rubber enclosure 80. The second ampoule 82, 86 is formed as a molded ampoule by mixing sodium borohydride powder and silicone rubber compound (AB mix GE silicones 42: RTV6166A silicone polymer and 6166B curing agent) and filling and separating from a mold. A skin of silicone rubber 86 (GE silicones RTV 118) 5 to 200 microns thick covers the second ampoule 82, 86. In operation methanol and water are vaporized from the volatile ampoule 89, 88 and diffuse through the open apertures of 79 and 81. The methanol and water vapors diffuse to the chemical hydride ampoule 86, 82 where they diffuse though the silicone rubber skin 86 and react with the sodium borohydride imbedded in the silicone rubber 82. Hydrogen gas 21 is produced and diffuses into the rubber walled cavity 83. The hydrogen gas leaves through the exit filter 85 made of expanded PTFE (Corning Costar) or hydrogen selective filter formed by coating an ultra filter (polyestersulfone PES; Pall Corporation, 2200 Northern Boulevard, East Hills, N.Y. 11548) with 5 nm of Pd, 50 nm 77% Pd/23% Ag alloy and a 5 nm film. The hydrogen then exits through the exit hose 84 to the fuel cell or hydrogen consuming device. The internal pressure of the hydrogen if higher than the outside pressure will put the rubber container walls 83 in tension and subsequently pull the diaphragm apertures 79 and 81 closer together. The ring seal 87 will progressively close off the diffusion route from aperture 79 to 81 as the pressure rises. If the pressure is high enough the tension in the wall 83 will cause the ring seal 87 to seal off. Details of this operation of the apertures are shown in FIGS. 9 and 10. In FIG. 9 the inlet aperture 75 is a hole, or holes, in the center area of a entrance wall diaphragm 92. The exit apertures 78 are arranged along the perimeter of the exit wall diaphragm 93. When the pressure is low the gas can freely diffuse through the apertures 75, 78. When the pressure is high, as shown in FIG. 10, the tension in the wall 83 pulls the aperture diaphragms 92, 93 together and causes the ring seal 77 to make a seal. By sealing or partially sealing the ring seal 77, the diffusion of reactants through the apertures 75 and the exit apertures 78 is fully or partially reduced.

Figure 11:
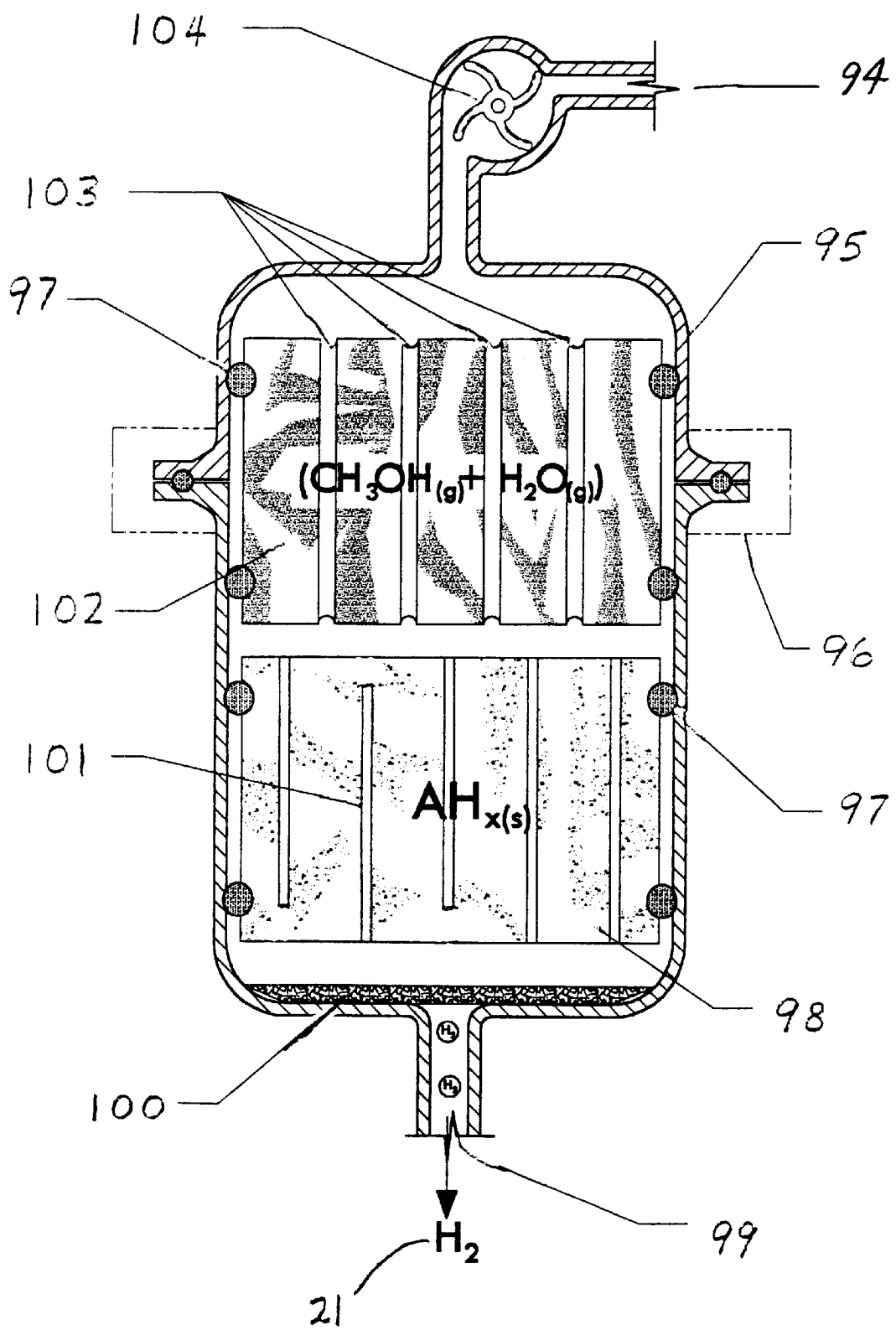
FIG. 11 schematically shows the gas pumped circulation system.

FIG. 11 shows a scheme in which liquid reactants are held in capillary tubes in one ampoule and are forced into contact with a hydrophobic encapsulated chemical hydride ampoule via feedback controlled gas pump. In this particular form an ampoule of one liquid reactant held in capillary wick 102 and a chemical hydride ampoule 98 are both placed and sealed in a reaction chamber 95. The reaction chamber forms gas tight seals 97 on the ampoules and at the access seal 96. The chemical hydride ampoule 98 is formed by mixing sodium borohydride powder with silicone rubber (AB mix GE silicones 42: RTV6166A silicone polymer and 6166B curing agent). This ampoule could be made to have exit and channels 101 interdigitated through the ampoule to form high surface diffusion contact throughout the ampoule and liquid free gas exit routes. The liquid reactant ampoule is formed as a bundle of capillary tubes with apertures smaller than 1 mm in diameter, made of materials such as PVC (polyvinylchloride) or polyethylene and treated to be hydrophilic. The liquid reactants, methanol and water, are wicked into the capillary tubes 103. These capillary tubes 103 could also consist of one long tube coiled and fused to form a compact ampoule with one opening on the pump side and one on the chemical hydride side. The other component of the system is a pressurizing pump 104, of the diaphragm or centripetal impeller type, which is electrically driven by the output of the fuel cell. It should be mentioned that an alternative scheme is to locate liquid pump 104 between the ampoules and pump the liquid reactant from the capillary ampoule 102 to the chemical hydride ampoule 101. Electronic controls can be used to control the output of the pump 104 to control the need for generated hydrogen 21. A filter 100 such as porous expanded PTFE (Corning Costar) to prevent liquid reactants from flowing into the fuel cell or the hydrogen consuming device is placed to cover the hydrogen exit port 99. The operation of this system consists of pressurizing gas 94 with the input pump 104; the electrical energy to run the pump could come from a capacitor charged by previous operation of the fuel cell. The inlet gas for the pump 104 could be obtained from the atmosphere or from the fuel vent exit of the fuel cell. When the pressure difference occurs across the capillary wick ampoule 102 the liquid in the capillary tubes 103 is pushed toward the chemical hydride ampoule 98. Vapor diffusion to the chemical hydride ampoule 98 could be sufficient for low hydrogen generation rates. The pressure from the generated hydrogen will push the liquid reactants back into the capillary tubes 103. For higher generation rates the liquid from the capillary tubes 103 makes contact with the chemical hydride ampoule 98. The liquid reactants flow into the flow channels 101 of the solid hydride 98. Once the liquid reactants are in the flow channels 101, bubbles will form in the liquid reactants and tend to push the liquid reactant through the open channels 103. With closed end channels the liquid will be bubbled out and will pressurize the area between the ampoules 102 and 98. Both closed and open flow channels 101 may be needed to achieve smooth and responsive reactions with the chemical hydrides and volatile reactants. The hydrogen 21 produced in the chemical hydride ampoule 98 diffuses and flows out of the channels 101. The hydrogen gas 21 is filtered of liquid reactants by the exit filter 100, and hydrogen gas 21 is delivered out of the exit port 99 and to a fuel cell or hydrogen consuming device.

While the invention has been described with reference to specific embodiments, modifications and variations of the invention may be constructed without departing from the scope of the invention, which is defined in the following claims.

We claim:

1. A hydrogen fuel gas generator, comprising:
    a first ampoule having a first reactant stored therein and having a first permeable membrane for passing a vapor from the first reactant out through the first membrane;
    a second ampoule having a second reactant therein and having a second permeable membrane for passing vapor from the first ampoule through the second permeable membrane into the second reactant, and for passing hydrogen outward through the second permeable membrane into a container; and
    a hydrogen outlet port in the container and a hydrogen conduit connected to the outlet for delivering the hydrogen to a hydrogen consuming device.

2. The apparatus of claim 1, further comprising a filter positioned adjacent the outlet port for permitting hydrogen to flow out of the outlet port.

3. The apparatus of claim 2, wherein the filter is a hydrogen permeable polymer.

4. The apparatus of claim 2, wherein the filter is a hydrogen permeable metal film.

5. The apparatus of claim 1, further comprising an intermediate permeable membrane spanning the container between the first and second ampoules.

6. The apparatus of claim 1, further comprising a fuel cell connected to the hydrogen conduit as the hydrogen consuming device.

7. The apparatus of claim 6, further comprising a channel connected to one of the ampoules from the fuel cell for returning elements and compounds from the fuel cell to one of the ampoules.

8. The apparatus of claim 1, further comprising a non-permeable membrane in the container between the first and second ampoules.

9. The apparatus of claim 8, further comprising an opening in the non-permeable membrane, and wherein the second permeable membrane is flexible for moving toward and away from the non-permeable membrane for closing and opening the opening according to relative pressures on opposite sides of the non-permeable membrane.

10. The apparatus of claim 9, further of vapors toward the second membrane.

11. The apparatus of claim 8, further comprising multiple openings in the non-permeable membrane and multiple flaps for selectively opening and closing the multiple openings.

12. The apparatus of claim 8, wherein the non-permeable membrane is a first non-permeable membrane, and further comprising a second non-permeable membrane and the ampoule, and a variable chamber between the first and second impermeable membranes, first and second openings in the first and second impermeable membranes, at least one of the impermeable membranes being flexible and operable for moving toward and away from the other impermeable membrane.

13. The apparatus of claim 12, having first and second flaps extending in a same direction for respectively opening and closing the first and second openings as the at least one impermeable membrane is flexed for varying volume of the chamber.

14. The apparatus of claim 12, wherein at least one of the impermeable membranes has a rim extending toward the other impermeable membrane for surrounding and blocking the openings in the other impermeable membrane from communicating with openings in the at least one membrane for controlling flow comprising additives in at least one ampoule for enhancing, catalyzing, humidifying, or providing an acidified gas stream to a consuming device.

15. A fueling apparatus, comprising at least two containers placed in close proximity to each other for moving fluid from at least one container into at least one other container for generating a hydrogen bearing fuel with at least one other container, and moving the hydrogen bearing fuel from the at least one other container to an exit.

16. The apparatus of claim 15, wherein at least one of the containers contains one or more chemical hydrides.

17. The apparatus of claim 15, wherein at least one of the containers contains one or more reactive solids.

18. The apparatus of claim 15, wherein at least one of the containers contains one or more volatile reactants.

19. The apparatus of claim 15, wherein walls of the containers are permeable to one or more volatile reactants.

20. The apparatus of claim 15, wherein walls of the containers are selectively permeable to one or more volatile reactants.

21. The apparatus of claim 15, wherein walls of the containers are made of silicone rubber or polymers that exhibit low permeability to water and high relative permeability to other reactants.

22. The apparatus of claim 15, wherein walls of the containers are made of silicone rubber or polymers that exhibit low permeability to water and high relative permeability to methanol, formaldehyde, carbon dioxide, acetic acid, or formic acid.

23. The apparatus of claim 15, wherein at least one of the containers contains one of the chemical hydrides of LiH, $LiAlH_4$, $LIBH_4$, NaH, $NaAlH_4$, $NaBH_4$ $MgH_2$, $Mg(BH_4)_2$, KH, $KBH_4$, $CaH_2$, or $Ca(BH_4)_2$.

24. The apparatus of claim 15, wherein walls of the containers are made of silicone rubber or polymers that exhibit low permeability to water and high relative permeability to methanol, carbon dioxide, sulfuric acid, acetic acid, or formic acid and one of the containers contains one of the metals of Li, Na, K, Rb, Al, or Ca.

25. The apparatus of claim 15, further comprising a reaction control mechanism adjacent the containers for regulating mass flow of reactants between the containers.

26. The apparatus of claim 15, further comprising a reaction control mechanism for regulating mass flow of reactants between the containers based on response to consumption or pressure of produced hydrogen.

27. The apparatus of claim 15, further comprising an adjuster connected to the containers, wherein fuel diffusion from at least one container is adjusted electrically or mechanically.

28. The apparatus of claim 15, further comprising mechanism regulating mass flow of reactants between the containers based on response to consumption or pressure of the produced hydrogen, which consists of valves, valves mechanically linked to the tension in the container walls, moveable apertures, pumps, fans, ion drag membranes and changing diffusion lengths.

29. The apparatus of claim 15, wherein the hydrogen-bearing fuel is hydrogen gas used in a fuel cell.

30. The apparatus of claim 29, wherein the produced hydrogen gas is filtered through a filter.

31. The apparatus of claim 29, herein the produced hydrogen gas is filtered through a selectively permeable filter.

32. The apparatus of claim 15, further comprising a mass flow conduit for conducting a mass flow back to the containers from a consuming device.

33. The apparatus of claim 15, wherein each container comprises two or more types of ampoules which, when used, are removed from impermeable containers and placed in proximity to the other type of ampoule and a fuel cell, and a cover is replaced to form a diffusion (manifold) plenum and restricts or excludes air exchange with the plenum.

34. The apparatus of claim 15, wherein products from a hydrogen consuming device react with reactants in the containers for supplementing or intensifying hydrogen production reaction between the reactants in the containers.

35. The apparatus of claim 15, wherein products or water or carbon dioxide from a hydrogen consuming device react with reactants in the containers for supplementing or intensifying the hydrogen production reaction between the reactants in the containers.

36. The apparatus of claim 15, wherein products or water or carbon dioxide from a hydrogen consuming device react with reactants in the containers for supplementing or intensifying hydrogen production reaction between the in the containers, and neutralizing a chemical hydride spent product.

37. The apparatus of claim 15, wherein the containers comprise ampoules, and wherein the ampoules are placed in an openable container that when sealed permits reactants the ampoules to react with each other to produce hydrogen.

38. The apparatus of claim 37, further comprising additives in the ampoules for causing an appearance change and indicating quantity of reactants in the ampoules.

39. The apparatus of claim 37, wherein the ampoules appearance changes as the reactants are consumed.

40. The apparatus of claim 37, further comprising a foam plenum between the first ampoule and the impermeable membrane, and a vent connected to the foam plenum for venting vapor from the first ampoule when the opening is closed.

41. The apparatus of claim 37, wherein selective permeabilities of the ampoules have a temperature dependent permeability to feeding the hydrogen bearing fuel at optimum rates at different temperatures.

42. The apparatus of claim 37, wherein the ampoule walls are formed with layers or composite of materials.

43. The apparatus of claim 37, further comprising storage container, walls are formed in layers or composite materials.

* * * * *